March 29, 1966 E. RICHTER 3,243,523

PHONOGRAPH PICKUP WITH REMOVABLE ROTATABLE STYLUS ASSEMBLY

Filed April 7, 1961 2 Sheets-Sheet 1

PHONOGRAPH PICKUP WITH REMOVABLE ROTATABLE STYLUS ASSEMBLY

Filed April 7, 1961

2 Sheets-Sheet 2

United States Patent Office 3,243,523

Patented Mar. 29, 1966

3,243,523

PHONOGRAPH PICKUP WITH REMOVABLE ROTATABLE STYLUS ASSEMBLY

Erhard Richter, Kiel, Schleswig-Holstein, Germany, assignor to Electroacustic Gesellschaft mit beschrankter Haftung, Kiel, Germany, a corporation of Germany Filed Apr. 7, 1961, Ser. No. 101,390

Claims priority, application Germany, Apr. 11, 1960, E 19,181

9 Claims. (Cl. 179—100.41)

My invention relates to a phonograph pickup for reproduction of twin-track binaural recordings, and more particularly to a pickup of the type wherein a stylus carrier is elastically mounted in a holder that can be rotated 180° between two positions in which one of two stylus tips, attached to the holder and pointing in opposite directions, can be selectively placed into active position, the stylus holder being connected with two transducers by a mechanical coupling member which transmits the track-responsive stylus deflections to the respective transducers for reproduction of the two sound tracks that jointly make up the binaural recording.

In known pickups of this type, the stylus carrier consists of an elastically bendable wire whose free end carries two diametrically opposite stylus tips on a common mounting member. The stylus carrier is rigidly linked with a piezoelectric barium-titanate transducer plate and is frictionally seated in an elastic sleeve so that the carrier can be exchanged if desired. The seated end of the wire-shaped stylus carrier is flattened to prevent carrier from rotating in the sleeve. The holder to which the stylus carrier is attached by means of the elastic sleeve is rotatable 180° between two positions and is removable from its bearings in the housing of the pickup. A handle for rotating the stylus carrier between the two active positions is mounted on the end of the holder remote from the stylus tips.

Such pickups leave much to be desired. In the first place, the elasticity of the spring wire used as the stylus carrier obviates the attainment of optimum quality with respect to the frequency characteristic of the pickup because a good frequency characteristic would require the provision of damping means which are difficult to apply to the pickup because they would have to have a uniform damping action in all possible directions of wire deflection. Secondly, the stylus carrier, in order to be sufficiently stable on the one hand but to be also sufficiently resilient on the other hand, must be given a relatively great length. Accordingly, the stylus holding structure occupies substantially the entire length of the pickup housing, and the transmission from the stylus points to the transducers involves a step-down ratio of unfavorable magnitude. Furthermore, the mounting of the two styli at the same place of the stylus carrier is considerably disadvantageous because each stylus, when in operative position, must have a proper inclination with respect to the plane of the record disc, the stylus carrier being also inclined relative to that plane. The size of the angle of stylus inclination relative to the record plane is of considerable influence upon the reproduction quality of twin-track stereophonic recordings, the quality of reproduction being reduced with an incerase of this angle.

It is an object of my invention to devise a phonograph pickup for stereophonic disc recordings, generally of the type above mentioned, which eliminates the deficiencies of the known pickups.

To this end, and in accordance with features of my invention, the stylus carrier consists of a relatively short and rigid rod and is universally pivoted in its holder by means of a short and very elastic grommet or sleeve so as to be rotatable in all directions substantially about a single bearing center. Furthermore, the holder on which the carrier rod is thus mounted, is provided with two glide bearings which are axially spaced from each other in coaxial relation to the stylus carrier rod, and the handle for rotating the stylus holder assembly relative to the housing 180° between the respective active positions of the two styli, is mounted between these two glide bearings.

The short axial length and rigidity of the stylus carrier rod, this length being only a fraction of that of the housing, in conjunction with the elastic mounting of the rigid rod in an axially short seat, affords attaining optimum reproduction quality. The double journalling of the holder assembly by means of the two glide bearings between which the handle is located further secures a reliable guidance of the stylus carrier during switching from one to the other stylus as well as during the sensing operation of each stylus. Moreover, the entire sensing device can be mounted on the bottom side of the pickup housing within a very compact space while remaining easily accessible for exchange.

According to another feature of my invention, the two journalling locations of the pickup housing in which the above-mentioned two glide bearings of the stylus holder assembly are rotatably seated, consist of downwardly open recesses in the housing structure, and the bearing portions of the stylus holder are held in these recesses by means of a leaf spring which acts upon the bearing portion located between the handle and the styli and which is laterally displaceable with respect to the pickup housing in order to permit placing the stylus holder assembly into the journalling recesses of the housing or removing the assembly therefrom. The lateral displacement of the leaf spring relative to the housing eliminates the danger of any permanent deformation of any journalling components occurring when the stylus holder assembly is being removed from the housing.

The foregoing and more specific objects, advantages and features of my invention, said features being set forth with particularity in the claims annexed hereto, will be understood from the following description of the embodiment of a pickup according to the invention illustrated by way of example on the accompanying drawings, in which:

Figure 1:
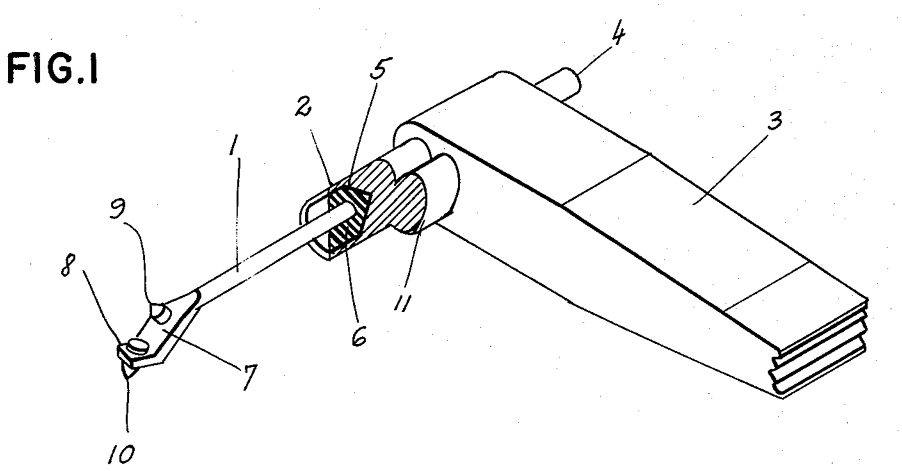
FIG. 1 is a partly sectional and perspective view of the stylus holder assembly.

The illustrated pickup comprises a stylus and handle assembly which, as a unit, is separable from the housing and other components of the pickup. This assembly, shown separately in FIG. 1, comprises a stylus carrier 1, a bearing cylinder 2, a manual switching lever 3, and a bearing pin 4. The stylus carrier 1 is designed as a short and rigid rod of circular cross section and very small mass consisting, for example, of aluminum. That is, the length of the rod in proportion to its cross section is such that the entire stylus carrier, during reproducing operation, operates as a completely rigid part which is capable of performing universal elastic deflections about a pivot center only by virtue of the elastic mounting described presently, but not because of any inherent flexibility of the rod. In harmony therewith the total length of the stylus-carrying rod is only a fraction of the length of the pickup housing. One end of the carrier rod 1 is elastically mounted in the bearing cylinder 2. The mounting is effected by an elastic synthetic material which is cast into the bore 5 of the bearing cylinder 2 and which, after being cured, firmly joins the stylus carrier with the inner wall of the bearing cylinder 2. The synthetic elastomer is of such type that it remains softly elastic after curing and thus performs the function of an elastic grommet 6. The portion of the stylus carrier 1 thus embedded in the softly elastic grommet 6 has a short axial length, preferably about equal to or smaller than the diameter of the grommet. The length of the embedded portion is about ⅕ to $\frac{1}{10}$ of the total length of the rod from the outermost stylus to the end of the embedded portion. As a consequence, the free end of the stylus carrier can be elastically pivoted in all directions about the bearing center point which is substantially fixed with respect to the longitudinal axis of the stylus carrier. Consequently, the elastic returning force to which the stylus carrier is subjected, as well as the damping effect of the grommet, are always substantially the same regardless or the particular direction in which the stylus carrier may be deflected at a time by the sensing response of the stylus tip.

The elastic grommet for universally pivoting the stylus carrier 1 in the above-described manner may also be produced by injecting the elastomer material into the bore of the bearing sleeve. The grommet may also consist of rubber which is firmly joined by cementing or vulcanizing with the stylus carrier as well as with the inner wall 5 of the bearing cylinder.

The free end of the stylus carrier 1 is provided with two flattened and substantially planar portions 7 and 8 located one behind the other and inclined toward the longitudinal axis of the stylus carrier in opposite directions respectively. Inserted into each of the flattened carrier portions 7 and 8 is a stylus tip 9 or 10. The symmetry axes of these stylus tips extend at an angle of less or more than 90° with respect to the longitudinal axis of the stylus rod, as contrasted to having the stylus-tip axes extend at a substantially right angle to the carrier axis. Preferably the two symmetry axes of the respective stylus tips are perpendicular to the planar area of the flattened portion that carries the tip.

A cam lobe 11 is joined with the front wall of the bearing cylinder 2 and with the manual switching lever 3. The switching lever 3 protudes radially away from the bearing cylinder 2 and extends in a direction normal to the plane defined by the respective symmetry axes of the two stylus tips 9 and 10. The above-mentioned bearing pin 4 is located on the side of the switching lever 3 facing away from the stylus carrier 1. The bearing pin 4 is coaxially related to the bearing cylinder 2 as well as to the stylus carrier 1, when the latter is in normal, undeflected position, and the shape of the switching lever 3 is symmetrical with respect to a symmetry axis passing through the axis of pin 4 and bearing sleeve 2.

The above-described subassembly according to FIG. 1, is inserted into the bottom side of a pickup housing 12 which is provided with respective bearing recesses for receiving and journalling the pivot pin 4 and the bearing cylinder 2 respectively. The bearing pin 4 is inserted into a downwardly open bed or recess 13 whose bight portion forms a cylindrical glide bearing for the pin. Adjacent to the bearing recess 13, the pickup housing 12 has a larger channel cavity 14 which extends transversely all the way through the housing structure. The switching lever 3 is located in the cavity 14 and can be turned 180° from the illustrated position in which it protrudes laterally beyond the confines of the pickup housing, to another position in which it similarly protrudes from the other side of the housing, each of the two switching positions being limited by one or the other side of the switching lever abutting against the channel bottom of the cavity 14. Shifting the lever 3 from one to the other position has the result of selectively placing one or the other of the stylus tips 9, 10 into active sensing position.

Figure 2:
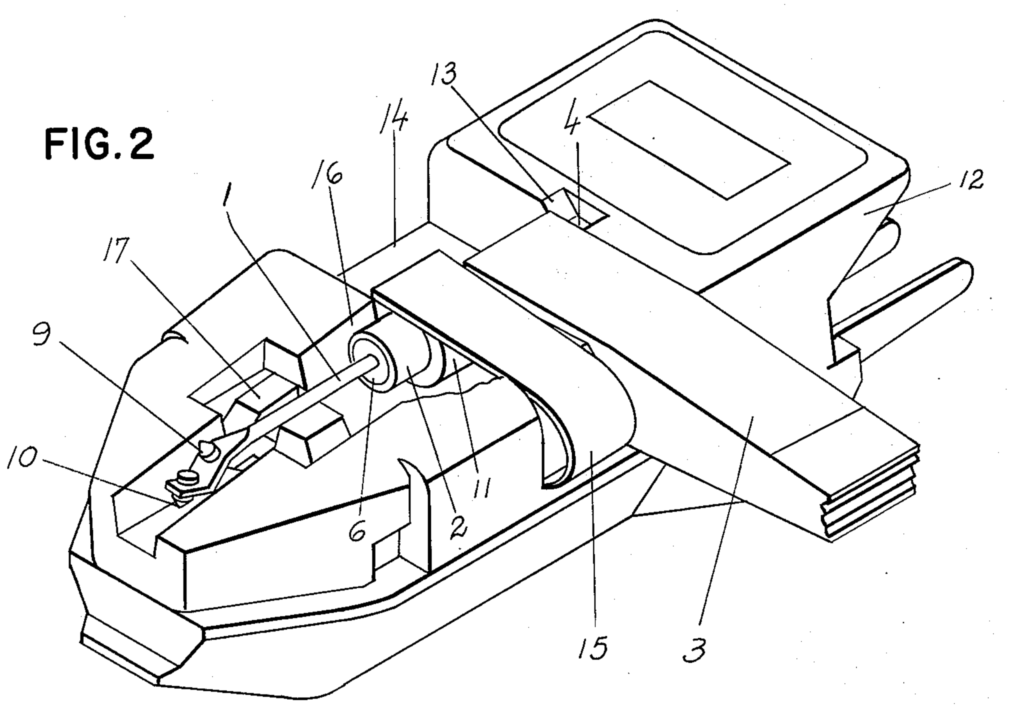
FIG. 2 is a perspective view onto the bottom side of the complete pickup, including the assembly of FIG. 1.

Mounted adjacent to the switching lever 3 is a leaf-spring bracket 15 which is generally U-shaped and has one of its two legs displaceably guided in a groove of the pickup housing 12 so that it can be pulled laterally out of the cavity 14 a sufficient distance to stay clear of the lobe 11 on bearing cylinder 2. When the leaf spring 15 is pulled out in the manner just described, the stylus and handle assembly of FIG. 1 can readily be inserted or exchanged. After insertion of the assembly, the spring 15 can be pushed back into its normal seat illustrated in FIG. 2. In this position, the leaf spring passes over the bearing sleeve 2 and the lobe 11. This has the effect of pre-tensioning the leaf spring which then securely holds the handle 3 in one of its two proper positions, due to the coaction of lobe 11 and spring 15. Thus the spring 15 not only secures the removable stylus and holder assembly in proper position within the pickup housing but also defines the two selective positions of the handle 3.

Next adjacent to the cavity 14 is another bearing bed or journalling recess formed by the pickup housing 12. This bearing recess 16 has a cylindrical bight engaged by the straight cylindrical portion of the bearing cylinder 2 not occupied by the lobe 11. The bearing recess 16, like the recess 13, is open toward the bottom side of the pickup. Therefore, the assembly of the stylus carrier with the bearing pin 4 and the cylinder 2 is held in the two bearing recesses of the pickup housing only by the action of the leaf spring 15.

Figure 3:
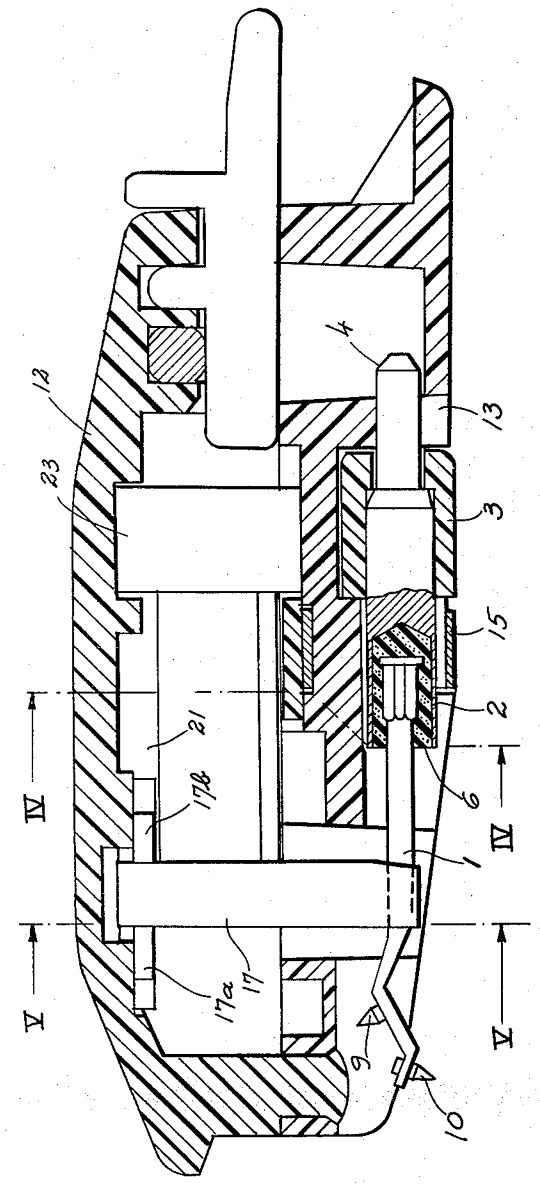
FIG. 3 is a longitudinal section of the pickup.
Figure 4:
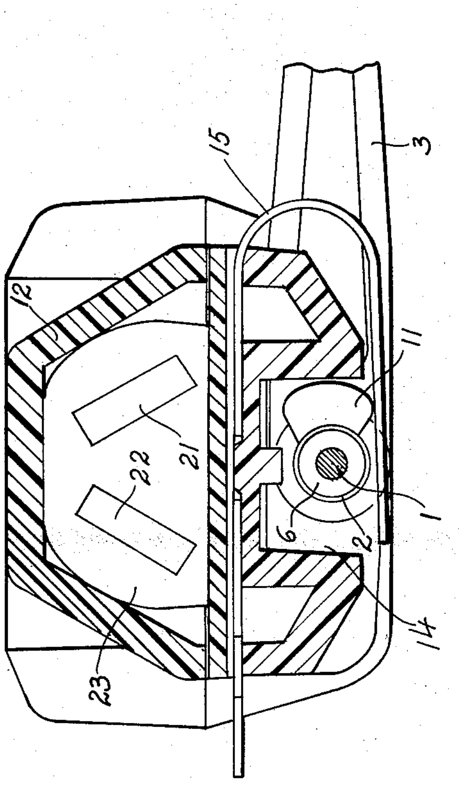
FIG. 4 is a cross section along the line IV—IV in FIG. 3.
Figure 5:
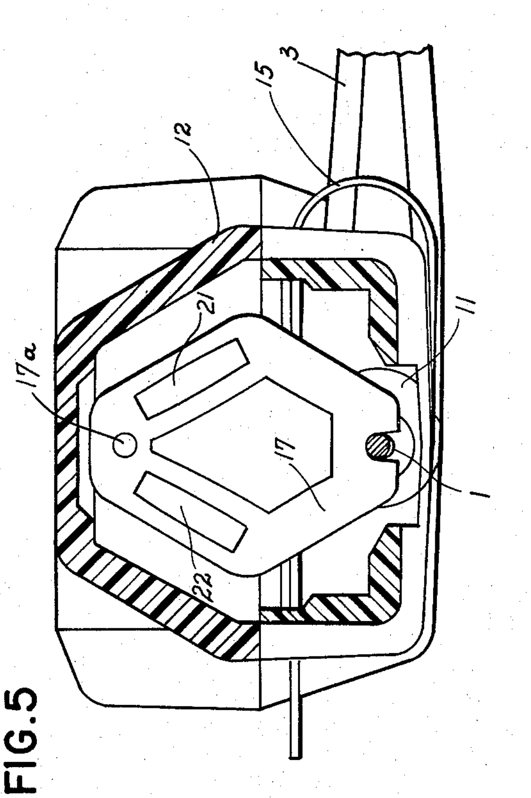
FIG. 5 is a cross section along the line V—V in FIG. 3.

Near its flattened free end, the stylus carrier 1 is coupled with a coupler piece 17 of elastic material. The connection is effected by having the stylus carrier pass through a downwardly open groove of the coupler. The coupler 17 is pivoted on a pin **17*a* seated in a downwardly open groove 17*b* of the housing (FIG. 3). Two substantially rectangular slots of the coupler are engaged by the ends of two transducers 21, 22 respectively. Thus, the coupler is in force-transmitting connection with the transducers for reproduction of the two component sound tracks and serves for transmitting the stylus deflections to the two transducers and also for damping the deflecting motion of the stylus carrier 1. This damping acts cumulatively with respect to the uniform damping produced in all directions of deflection by the elastic grommet 6. The two transducers 21, 22 consist of piezoelectric material for example barium-titanate ceramic plates. Their other ends are rigidly mounted in a block 23** firmly seated in the housing.

As explained, the coaction of the cam lobe 11 with the spring bracket 15 permits the stylus assembly to be placed in only two definite positions in which either the stylus 9 or the stylus 10 is available for response to a sound track. The stylus tips may have the same shape or they may have respectively different tip curvatures for reproduction of different types of recordings such as record discs for 78 r.p.m. and discs for 45 and 33 r.p.m. respectively. The two stylus tips may also consist of different materials. For example, the stylus tip 9 may consist of sapphire and the tip 10 of diamond. If in this case the two stylus tips have the same shape, the cheaper sapphire tip may be used ordinarily, whereas the more expensive diamond tip can be employed only for particularly valuable recordings.

I claim:

1. A phonograph pickup for binaural twin-track recordings, comprising a housing, two transducers mounted in said housing for response to the respective two sound tracks, a coupling piece movably mounted in said housing and connected with said transducers for mechanically actuating them, said housing having two coaxially spaced journalling means; a stylus subassembly removably joined with said housing and comprising a holder having two glide-bearing portions coaxially spaced from each other and in engagement with said respective journalling means of said housing, spring means mounted on said housing and slidably movable between two positions for holding said holder portion in said journalling means when in one of said positions and for permitting release of said holder portion in the other of said positions, said holder having a handle located between said two glide-bearing portions and laterally protruding therefrom beyond the confines of said housing to permit manually turning said holder 180° about the glide-bearing axis, an elastic grommet coaxially mounted on said holder at one end thereof, a rigid stylus-carrier rod having one end coaxially seated in said grommet and having near its other end two stylus tips differently spaced from said grommet and pointing in opposite directions to be selectively placed in operative position by turning said handle, said rod engaging said coupler between said grommet and said tips, the seated end of said stylus rod being axially shorter than the diameter of said grommet whereby said rigid stylus rod is universally pivotable due to the elasticity of said grommet about a pivot center substantially fixed with respect to the axis of said rigid rod, said grommet and carrier and tips forming part of said subassembly together with said holder.

2. A phonograph pickup for binaural twin-track recordings, comprising a housing, two transducers mounted in said housing for response to the respective two sound tracks, a coupler mounted in said housing and connected with said transducers for mechanically actuating them, said housing having two coaxially spaced journalling recesses downwardly open at the bottom side of the housing, a holder having two glide-bearing portions coaxially spaced from each other and in journalled engagement with said respective housing recesses, spring means mounted on said housing and slidably movable between two positions for holding said holder portion in said recesses when in one of said positions and for permitting release of said holder portion in the other of said positions, said holder having a handle located between said two glide-bearing portions and laterally protruding therefrom to permit manually turning said holder 180° about the glide-bearing axis, an elastic grommet coaxially mounted on said holder at one end thereof, a rigid stylus-carrier rod having one end coaxially seated in said grommet and having near its other end two stylus tips differently spaced from said grommet and pointing in opposite directions to be selectively placed in operative position by turning said handle, said rod engaging said coupler between said grommet and said tips, the seated end of said stylus rod being axially shorter than the diameter of said grommet whereby said rigid stylus rod is universally pivotable due to the elasticity of said grommet about a pivot center substantially fixed with respect to the axis of said rigid rod.

3. In a phonograph pickup according to claim 2, said spring means comprising a leaf spring member seated on said housing and laterally displaceable relative thereto, said leaf spring member being normally in engagement with said holder and tensioned thereby to keep said bearing portions in said respective housing recesses, and said spring member being disengaged from said holder when in laterally displaced position to then permit removal of said holder from said housing.

4. In a phonograph pickup according to claim 2, one of said two bearing portions of said holder consisting of a bearing pin at the side of said handle facing away from said stylus carrier, said other bearing portion comprising a cylindrical structure hollow at its end for receiving said grommet, and a cam lobe joined with said cylindrical structure and extending over part of the axial length of said structure, said lobe being outside of the journalling recess in which said cylinder structure is rotatably seated, a leaf spring member seated on said housing and laterally displaceable relative thereto, said leaf spring member being normally in engagement with cam lobe for arresting said holder in said respective operative positions and retaining said bearing portions in said respective housing recesses, and said spring member being disengaged from said holder when in laterally displaced position to then permit removal of said holder from said housing.

5. In a phonograph pickup according to claim 2, said stylus-carrier rod having at its free end two flat portions, one behind the other along the rod axis, said flat rod portions being inclined in opposite directions respectively toward the rod axis, and said two stylus tips being mounted on said respective flat portions and having respective symmetry axis inclined toward said rod axis.

6. In a phonograph pickup according to claim 2, said coupler consisting of elastic material and having a downwardly open groove traversed by said stylus-carrier rod, said rod being in force-constrained engagement with said coupler groove but rotatable about the rod axis relative to said coupler.

7. In a phonograph pickup according to claim 2, said stylus-carrier rod being non-rotatably joined with the material of said grommet, and said grommet being non-rotatably joined with said holder, whereby the motion of said rod relative to said holder is limited to universal pivoting about said center.

8. A phonograph pickup for binaural twin-track recordings, comprising a housing, two transducers mounted in said housing for response to the respective two sound tracks, a coupling piece movably mounted in said housing and connected with said transducers for mechanically actuating them, said housing having two coaxially spaced journalling means; a stylus subassembly removably joined with said housing and comprising a holder having two glide-bearing portions coaxially spaced from each other and in engagement with said respective journalling means of said housing, spring means mounted on said housing and slidably movable between two positions for holding said holder portion in said journalling means in one of said positions and for permitting release of said holder portion in the other of said positions, said holder having a handle located between said two glide-bearing portions and laterally protruding therefrom beyond the confines of said housing to permit manually turning said holder 180° about the glide-bearing axis, an elastic grommet coaxially mounted on said holder at one end thereof, a rigid stylus-carrier rod having one end coaxially seated in said grommet and having near its other end two stylus tips pointing in opposite directions to be selectively placed in operative position by turning said handle, said grommet and carrier and tips forming part of said subassembly together with said holder.

9. A phonograph pickup for binaural twin-track recordings, comprising a housing, two transducers mounted in said housing for response to the respective two sound tracks, a coupler mounted in said housing and connected with said transducers for mechanically actuating them, said housing having two coaxially spaced journalling recesses downwardly open at the bottom side of the housing, a holder having two glide-bearing portions coaxially spaced from each other and in journalled engagement with said respective housing recesses, spring means mounted on said housing and slidably movable between two positions for holding said holder portion in said recesses when in one of said positions and for permitting release of said holder portion in the other of said positions, said spring means including a U-shaped leaf spring having one leg slidably engaging said housing and the other leg slidably engaging said holder portion, said holder having a handle located between said two glide-bearing portions and laterally protruding therefrom to permit manually turning said holder 180° about the glide-bearing axis, an elastic grommet coaxially mounted on said holder at one end thereof, a rigid stylus-carrier rod having one end coaxially seated in said grommet and having near its other end two stylus tips differently spaced from said grommet and pointing in opposite directions to be selectively placed in operative position by turning said handle, said rod engaging said coupler between said grommet and said tips, the seated end of said stylus rod being axially shorter than the diameter of said grommet whereby said rigid stylus rod is universally pivotable due to the elasticity of said grommet about a pivot center substantially fixed with respect to the axis of said rigid rod.

(References on following page)

References Cited by the Examiner

UNITED STATES PATENTS

| | | | |
|---|---|---|---|
| 2,179,272 | 11/1939 | Poma | 211—4 |
| 2,934,610 | 4/1960 | Dieter | 179—100.41 |
| 2,958,422 | 11/1960 | Caloiero | 211—4 |
| 2,980,428 | 4/1961 | Blashewski | 274—36 |

BERNARD KONICK, *Primary Examiner.*

JOHN P. WILDMAN, IRVING L. SRAGOW, *Examiners.*

H. S. WILLIAMS, J. P. SCHERLACHER, *Assistant Examiners.*